US010800938B2

(12) United States Patent
Keoshkerian et al.

(10) Patent No.: US 10,800,938 B2
(45) Date of Patent: Oct. 13, 2020

(54) MOLECULAR ORGANIC REACTIVE INKS FOR CONDUCTIVE METAL PRINTING USING PHOTOINITIATORS

(71) Applicant: Xerox Corporation, Norwalk, CT (US)

(72) Inventors: Barkev Keoshkerian, Thornhill (CA); Michelle N. Chrétien, Mississauga (CA); Adela Goredema, Ancaster (CA); Sarah J. Vella, Milton (CA)

(73) Assignee: Xerox Corporation, Norwalk, CT (US)

( * ) Notice: Subject to any disclaimer, the term of this patent is extended or adjusted under 35 U.S.C. 154(b) by 264 days.

(21) Appl. No.: 15/706,685

(22) Filed: Sep. 16, 2017

(65) Prior Publication Data
US 2019/0085195 A1    Mar. 21, 2019

(51) Int. Cl.
| | |
|---|---|
| *C09D 11/00* | (2014.01) |
| *C09D 11/38* | (2014.01) |
| *C09D 11/52* | (2014.01) |
| *C09D 11/03* | (2014.01) |
| *C08F 4/04* | (2006.01) |
| *C08F 4/34* | (2006.01) |
| *C09D 11/033* | (2014.01) |
| *C09D 1/00* | (2006.01) |
| *C09D 4/00* | (2006.01) |
| *C09D 5/00* | (2006.01) |
| *C09K 3/00* | (2006.01) |
| *C08F 12/08* | (2006.01) |

(52) U.S. Cl.
CPC ............... *C09D 11/38* (2013.01); *C08F 4/04* (2013.01); *C08F 4/34* (2013.01); *C09D 11/03* (2013.01); *C09D 11/033* (2013.01); *C09D 11/52* (2013.01); *C08F 12/08* (2013.01)

(58) Field of Classification Search
USPC ................. 106/31.92, 31.13, 31.01
See application file for complete search history.

(56) References Cited

U.S. PATENT DOCUMENTS

| | | | |
|---|---|---|---|
| 7,270,694 B2 | 9/2007 | Li et al. | |
| 8,765,025 B2 | 7/2014 | Wu et al. | |
| 9,486,996 B2 | 8/2016 | Ng et al. | |
| 9,725,614 B2 | 8/2017 | Liu et al. | |
| 9,752,040 B2 | 9/2017 | Goredema et al. | |
| 2007/0099109 A1* | 5/2007 | Dorogy | G11B 7/0037 430/270.1 |
| 2008/0206488 A1 | 8/2008 | Chung et al. | |
| 2010/0216934 A1* | 8/2010 | Sahlberg | C08L 51/04 524/522 |
| 2015/0240101 A1 | 8/2015 | Chopra et al. | |
| 2016/0057866 A1 | 2/2016 | Shimoda et al. | |
| 2017/0240758 A1 | 8/2017 | Liu et al. | |
| 2017/0253757 A1 | 9/2017 | Salami et al. | |
| 2017/0369322 A1* | 12/2017 | Mangadlao | B01J 23/52 |

FOREIGN PATENT DOCUMENTS

| | | |
|---|---|---|
| EP | 2123723 A1 | 11/2009 |
| EP | 3354629 A1 | 8/2018 |
| WO | WO 2013/036519 A1 | 3/2013 |
| WO | WO 2015/010198 A1 | 1/2015 |

OTHER PUBLICATIONS

Extended European Search Report issued in European Application No. 18194632.8-1102, dated Nov. 30, 2018, 6 pages.
Ping Liu, et al., U.S. Appl. No. 15/339,399, filed Oct. 31, 2016, "Metal Nanoparticle Ink Composition for Printed Electronic Device Applications," not yet published.

* cited by examiner

*Primary Examiner* — James E McDonough
(74) *Attorney, Agent, or Firm* — Marylou J. Lavoie, Esq. LLC

(57) ABSTRACT

An ink composition including a metal salt; an optional solvent; and a stable component that is stable in the ink composition until treated, wherein, upon treatment, the component forms a compound that reduces the metal salt to form metal. An ink composition including a metal salt; an initiator; and an optional solvent; wherein, upon treatment, the initiator forms a compound which reduces the metal salt to metal. A process including combining a metal salt, an initiator, and an optional solvent, to form an ink; wherein, upon treatment, the initiator forms a compound which reduces the metal salt to metal. A process including providing an ink composition comprising a metal salt, an initiator, and an optional solvent; depositing the ink composition onto a substrate to form deposited features; and treating the deposited features on the substrate wherein the initiator forms a compound which reduces the metal salt to metal to form conductive features on the substrate.

20 Claims, No Drawings

MOLECULAR ORGANIC REACTIVE INKS FOR CONDUCTIVE METAL PRINTING USING PHOTOINITIATORS

BACKGROUND

Disclosed herein is an ink composition including a metal salt; an initiator; and an optional solvent; wherein, upon treatment, the initiator forms a compound which reduces the metal salt to metal. Also disclosed is a process including combining a metal salt, an initiator, and an optional solvent, to form an ink; wherein, upon treatment, the initiator forms a compound which reduces the metal salt to metal. Also disclosed is a process including providing an ink composition comprising a metal salt, an initiator, and an optional solvent; depositing the ink composition onto a substrate to form deposited features; and treating the deposited features on the substrate wherein the initiator forms a compound which reduces the metal salt to metal to form conductive features on the substrate.

Conductive inks are desired for fabricating conductive patterns for electronic device applications.

There are currently three broad methods for printing conductive patterns. One method is to print metallic flakes. A second method is to prepared stabilized nanoparticles of the metal and subsequently print them followed by sintering. This method allows sintering at much lower temperatures than the bulk metal would require. A third method is to print metallic complexes that are then converted to the metal on the image substrate or object by chemical means.

Printable electronics inks typically use one of these methods, for example printing silver flakes, printing silver nanoparticles, or using silver complexes as the conductive element or conductive precursor prior to printing. For each of these ink categories, there can be drawbacks in ink stability, ease of preparation, and post printing requirements. Metallic flakes can be difficult to print via ink jet printing. Nanoparticle inks can be difficult to prepare and keep stable. Even small increases in the size of the nanoparticles, for example, from 5 nanometers to 10 nanometers in average particle diameter, can result in a 30° C. change in sintering temperatures. Metal complex precursors offer flexibility in terms of printing latitude, but can be difficult to prepare and handle, and can be cost prohibitive.

Solution processable conducting materials, including silver nanoparticle inks, play an important role in electronic device integrations. Conductive inks that can be easily dispersed in suitable solvents and used to fabricate various conducting features in electronic devices such as electrodes and electrical interconnectors by low-cost solution deposition and patterning techniques including spin coating, dip coating, aerosol printing, and ink jet printing technologies are particularly desired.

Xerox® Corporation has invented a nanosilver particle which is stabilized by an organoamine U.S. Pat. No. 8,765,025, which is hereby incorporated by reference herein in its entirety, describes a metal nanoparticle composition that includes an organic-stabilized metal nanoparticle and a solvent in which the solvent selected has the following Hansen solubility parameters: a dispersion parameter of about 16 $MPa^{0.5}$, or more, and a sum of a polarity parameter and a hydrogen bonding parameter of about 8.0 $MPa^{0.5}$ or less. U.S. Pat. No. 7,270,694, which is hereby incorporated by reference herein in its entirety, describes a process for preparing stabilized silver nanoparticles comprising reacting a silver compound with a reducing agent comprising a hydrazine compound by incrementally adding the silver compound to a first mixture comprising the reducing agent, a stabilizer comprising an organoamine, and a solvent.

U.S. patent application Ser. No. 13/866,704, which is hereby incorporated by reference herein in its entirety, describes stabilized metal-containing nanoparticles prepared by a first method comprising reacting a silver compound with a reducing agent comprising a hydrazine compound by incrementally adding the silver compound to a first mixture comprising the reducing agent, a stabilizer comprising an organoamine, and a solvent. U.S. patent application Ser. No. 14/188,284, which is hereby incorporated by reference herein in its entirety, describes conductive inks having a high silver content for gravure and flexographic printing and methods for producing such conductive inks.

U.S. patent application Ser. No. 15/061,618, which is hereby incorporated by reference herein in its entirety, describes in the Abstract thereof an ink composition including a metal nanoparticle; at least one aromatic hydrocarbon solvent, wherein the at least one aromatic hydrocarbon solvent is compatible with the metal nanoparticles; at least one aliphatic hydrocarbon solvent, wherein the at least one aliphatic hydrocarbon solvent is compatible with the metal nanoparticles; wherein the ink composition has a metal content of greater than about 45 percent by weight, based upon the total weight of the ink composition; wherein the ink composition has a viscosity of from about 5 to about 30 centipoise at a temperature of about 20 to about 30° C. A process for preparing the ink composition. A process for printing the ink composition comprising pneumatic aerosol printing.

U.S. patent application Ser. No. 14/630,899, which is hereby incorporated by reference herein in its entirety, describes in the Abstract thereof a process including selecting a printing system; selecting an ink composition having ink properties that match the printing system; depositing the ink composition onto a substrate to form an image, to form deposited features, or a combination thereof; optionally, heating the deposited features to form conductive features on the substrate; and performing a post-printing treatment after depositing the ink composition.

U.S. patent application Ser. No. 14/594,746, which is hereby incorporated by reference herein in its entirety, describes in the Abstract thereof a nanosilver ink composition including silver nanoparticles; polystyrene; and an ink vehicle. A process for preparing a nanosilver ink composition comprising combining silver nanoparticles; polystyrene; and an ink vehicle. A process for forming conductive features on a substrate using flexographic and gravure printing processes comprising providing a nanosilver ink composition comprising silver nanoparticles; polystyrene; and an ink vehicle; depositing the nanosilver ink composition onto a substrate to form deposited features; and heating the deposited features on the substrate to form conductive features on the substrate.

U.S. patent application Ser. No. 15/339,399, which is hereby incorporated by reference herein in its entirety, describes in the Abstract thereof an ink composition including a metal nanoparticle; a viscous heat decomposable liquid, wherein the viscous heat decomposable liquid imparts a desired viscosity to the ink composition and which evaporates at a sintering temperature of the metal nanoparticle; an optional solvent; wherein the ink composition has a metal content of less than about 25 percent by weight, based upon the total weight of the ink composition; and wherein the ink composition has a viscosity of from about 50 to about 200 centipoise at a temperature of about 20 to about 30° C. A process for preparing the ink composition and for printing the ink composition. A flexographic printing process or gravure printing process including the ink composition.

While currently available conductive inks are suitable for their intended purposes, there remains a need for improved inks suitable for conductive ink applications. There further remains a need for alternative means for preparing inks that are low cost, easy to prepare, and have low post printing complexity. There further remains a need for such improved inks that are suitable as conductive inks for both two dimensional and three dimensional printing applications.

The appropriate components and process aspects of the each of the foregoing U.S. patents and patent Publications may be selected for the present disclosure in embodiments thereof. Further, throughout this application, various publications, patents, and published patent applications are referred to by an identifying citation. The disclosures of the publications, patents, and published patent applications referenced in this application are hereby incorporated by reference into the present disclosure to more fully describe the state of the art to which this invention pertains.

SUMMARY

Described is an ink composition comprising a metal salt; an optional solvent; and a stable component that is stable in the ink composition until treated, wherein, upon treatment, the component forms a compound that reduces the metal salt to form metal.

Described is an ink composition comprising a metal salt; an initiator; and an optional solvent; wherein, upon treatment, the initiator forms a compound which reduces the metal salt to metal.

Also described is a process comprising combining a metal salt, an initiator, and an optional solvent, to form an ink; wherein, upon treatment, the initiator forms a compound which reduces the metal salt to metal.

Also described is a process comprising providing an ink composition comprising a metal salt, an initiator, and an optional solvent; depositing the ink composition onto a substrate to form deposited features; and treating the deposited features on the substrate wherein the initiator forms a compound which reduces the metal salt to metal to form conductive features on the substrate.

DETAILED DESCRIPTION

A molecular organic reactive ink composition herein comprises a metal salt, an optional solvent, and a component that is stable in the ink composition until treated, wherein, upon treatment, the component forms a compound that reduces the metal salt to form metal. In certain embodiments, the stable component is a photoinitiator which is stable until exposed to irradiation, in embodiments, ultraviolet irradiation. In other embodiments, the stable component is an initiator which is stable until triggered with heat, such as, for example azobisisobutyronitrile (AIBN), peroxides, etc. In specific embodiments, the ink comprises one or more silver salts, in embodiments, silver nitrate or silver acetate, and an initiator, in embodiments, a photoinitiator or a thermal initiator, wherein, upon irradiation, heating, or other triggering event, the initiator forms a radical that reduces the silver salt to silver metal. In embodiments, the trigger comprises irradiation, or light, in contrast to a thermal trigger. In other embodiments, the trigger comprises a thermal trigger.

In embodiments, an ink composition herein comprises a metal salt; an optional solvent; and a stable component that is stable in the ink composition until treated, wherein, upon treatment, the component forms a compound that reduces the metal salt to form metal.

In embodiments, the ink composition comprises a metal salt; an initiator; and an optional solvent; wherein, upon treatment, the initiator forms a compound which reduces the metal salt to metal.

Metal Salt.

The metal salt selected for embodiments herein can comprise any suitable or desired metal. In embodiments, the metal salt comprises a metal selected from the group consisting of silver, cobalt, copper, nickel, gold, palladium, and combinations thereof. In embodiments, the metal salt is selected from the group consisting of silver salt, cobalt salt, copper salt, nickel salt, gold salt, palladium salt, and combinations thereof.

In embodiments, the silver may be elemental silver, a silver alloy, or a combination thereof. In embodiments, the silver may be a base material coated or plated with pure silver, a silver alloy, or a silver compound. For example, the base material may be copper flakes with silver plating. The silver alloy may be formed from at least one metal selected from Au, Cu, Ni, Co, Pd, Pt, Ti, V, Mn, Fe, Cr, Zr, Nb, Mo, W, Ru, Cd, Ta, Re, Os, Ir, Al, Ga, Ge, In, Sn, Sb, Pb, Bi, Si, As, Hg, Sm, Eu, Th, Mg, Ca, Sr, and Ba, although not limited.

In embodiments, the silver compound may include either or both of (i) one or more other metals and (ii) one or more non-metals. Suitable other metals include, for example, Al, Au, Pt, Pd, Cu, Co, Cr, In, and Ni, particularly the transition metals, for example, Au, Pt, Pd, Cu, Cr, Ni, and mixtures thereof. Exemplary metal composites are Au—Ag, Ag—Cu, Au—Ag—Cu, and Au—Ag—Pd. Suitable non-metals in the metal composite include, for example, Si, C, and Ge. In certain embodiments the silver is composed of elemental silver.

In embodiments, the metal may comprise solely elemental silver or may be a silver composite, including composites with other metals. Such silver composites may include either or both of (i) one or more other metals and (ii) one or more non-metals. Suitable other metals include, for example Al, Au, Pt, Pd, Cu, Co, Cr, In and Ni, such as, the transition metals, for example, Au, Pt, Pd, Cu, Cr, Ni and mixtures thereof. Exemplary metal composites are Au—Ag, Ag—Cu, Au—Ag—Cu and Au—Ag—Pd. Suitable non-metals in the silver composite include, for example, Si, C and Ge. The various non-silver components of the silver composite may be present in an amount ranging, for example, from about 0.01% to about 99.9% by weight, from about 10% to about 90% by weight. In embodiments, the silver composite is a metal alloy composed of silver and one, two or more other metals, with silver comprising, for example, at least about 20% of the composite by weight, or greater than about 50% of the composite by weight. Unless otherwise noted, the weight percentages recited herein for the components of the silver-containing composite do not include a stabilizer.

Silver composed of a silver composite can be made, for example, by using a mixture of: (i) a silver compound (or compounds, such as, a silver (I) ion-containing compound); and (ii) another metal salt (or salts) or another non-metal (or non-metals) during a reduction step.

The metal salt can be present in the ink composition in any suitable or desired amount. In embodiments, the metal salt is present in ink composition in an amount of from about 5 to about 75, or from about 10 to about 50, or from about 15 to about 40 percent by weight, based upon the total weight of the ink composition.

Any suitable or desired metal salt can be selected. Any suitable or desired metal can be used for the metal salts including the metals described herein above. In embodiments, the metal salt comprises a metal selected from the group consisting of cobalt, silver, copper, nickel, gold, palladium, and combinations thereof. In embodiments, the metal salt is selected from the group consisting of metal benzoate, metal halide, metal carbonate, metal citrate, metal iodate, metal iodide, metal nitrite, metal nitrate, metal acetate, metal phosphate, metal sulfate, metal sulfide, metal trifluoroacetate, and combinations thereof.

In embodiments, the metal salt comprises a member selected from the group consisting of silver nitrate, silver acetate, silver fluoride, silver triflate, and combinations thereof.

Stable Component/Initiator.

The ink composition includes a stable component that is stable in the ink composition until treated, wherein, upon treatment, the component forms a compound that reduces the metal salt to form metal.

In embodiments, the stable component is an initiator, wherein, upon treatment, the initiator forms a compound, for example, a radical, which reduces the metal salt to metal. Any suitable or desired initiator can be selected for embodiments herein. In specific embodiments, the initiator is a non-thermally activated initiator and treatment is a non-thermal trigger, in embodiments, irradiation, in embodiments, ultra violet light irradiation. In other embodiments, the initiator is a thermal initiator and the treatment is a thermal (heat) trigger.

In embodiments, the stable component is an initiator selected from the group consisting of photoinitiators, heat triggered initiators, radiation initiated photoinitiators, in embodiments, ultra violet radiation initiated photoinitiators, and combinations thereof.

Thus, in embodiments, the stable component is a photoinitiator, wherein, upon treatment, the photoinitiator forms a radical which reduces the metal salt to metal.

In embodiments, the stable component is a photoinitiator, wherein, upon irradiation, the photoinitiator forms a radical which reduces the metal salt to metal.

In embodiments, the stable component is a heat triggered initiator or thermal initiator (or thermally activated initiator), wherein, upon heating, the thermally activated initiator forms a radical which reduces the metal salt to metal.

Any suitable or desired initiator can be selected for the ink compositions herein. In embodiments, the initiator is selected from the group consisting of hydrogen peroxide, 2,2'-azobis-[2-methyl-propanimidamide]dihydrochloride, azobisisobutyronitrile, benzoyl peroxide, and combinations thereof.

The stable component, in embodiments, the photoinitiator, can be present in ink composition in any suitable or desired amount. In embodiments, the stable component is present in the ink composition in an amount of from about 0.5 to about 2, or from about 0.8 to about 1.5, or from about 1 to about 1.2 molarity of the metal salt or, in embodiments, silver salt.

Solvent.

The ink composition can include a solvent. Any suitable or desired solvent can be selected. In embodiment, the solvent is water or a combination of water and an additional solvent. The additional solvent can be any suitable or desired solvent, provided that the additional solvent is miscible with water.

In embodiments, the solvent is selected from the group consisting of water, organic solvents, and combinations thereof. In certain embodiments, the solvent is selected from the group consisting of water, alcohol, and combinations thereof.

Suitable water-miscible solvents include, but are not limited to, butanols, acetaldehyde, acetone, acetonitrile, 1,2-Butanediol, 1,3-Butanediol, 1,4-Butanediol, 2-Butoxyethanol, diethanolamine, diethylenetriamine, dimethylformamide, dimethoxyethane, dimethyl sulfoxide, 1,4-Dioxane, ethanol, ethylamine, ethylene glycol, formic acid, furfuryl alcohol, glycerol, methanol, methyl diethanolamine, 1-Propanol, 1,3-Propanediol, 1,5-Pentanediol, 2-Propanol, propylene glycol, pyridine, tetrahydrofuran, triethylene glycol, tetrahydrofuran, and combinations thereof.

The solvent can be present in the ink composition in any suitable or desired amount. In embodiments, the solvent is present in the ink composition complex in an amount of from about 10 to about 90, or from about 20 to about 60, or from about 25 to about 40 percent by weight, based upon the total weight of the ink composition.

The ink composition is stable at room temperature. Room temperature can be, for example, from about 20 to about 25° C. In embodiments, the ink composition is stable at elevated temperatures, in embodiments, at elevated temperatures of from about 30 to about 130° C., or from about 40 to about 100° C., or from about 60 to about 80° C. Thus, the ink can be stored at room temperature or an elevated temperature and remain stable until treated so as to trigger the stable component to form the compound that reduces the silver salt. In embodiments, the treatment being a non-thermal treatment, in embodiments, irradiation, in certain embodiments, ultra violet irradiation.

The ink compositions can be prepared by any suitable process, such as by simple mixing of the ingredients. One process entails mixing all of the ink ingredients together and filtering the mixture to obtain an ink. Inks can be prepared by mixing the ingredients, heating if desired, and filtering, followed by adding any desired additional additives to the mixture and mixing at room temperature with moderate shaking until a homogeneous mixture is obtained, in embodiments from about 5 to about 10 minutes, up to about 24 hours. Alternatively, the optional ink additives can be mixed with the other ink ingredients during the ink preparation process, which takes place according to any desired procedure, such as by mixing all the ingredients, heating if desired, and filtering.

In embodiments, the ink composition is prepared by a process comprising combining a metal salt, an initiator, and an optional solvent, to form an ink; wherein, upon treatment, the initiator forms a compound which reduces the metal salt to metal.

The ink composition can be employed in any suitable or desired printing process. The molecular organic reactive ink composition can be deposited by any suitable or desired method. In embodiments, the molecular organic reactive ink composition can be deposited by a method comprising coating the molecular organic reactive ink composition onto a substrate, in embodiments, polyethylene terephthalate (PET) film, treating the coated ink wherein, upon treatment, the metal salt is reduced to metal, and, optionally, measuring the resistivity of the resulting layer.

In embodiments, a process for forming conductive features on a substrate herein comprises providing the present ink composition; depositing the ink composition onto a substrate to form deposited features; and treating, in embodiments, irradiating, in embodiments, ultra violet light irradiating, the deposited features on the substrate to form conductive features on the substrate. In embodiments, the process for forming conductive features on a substrate comprises an ink jet printing process, a two dimensional printing process, a three dimensional printing process, a flexographic printing process, a gravure printing process, or a combination thereof.

In embodiments, a process herein comprises providing the present ink composition; depositing the ink composition onto a substrate to form deposited features, an ink image, or a combination thereof. In embodiments, the process further comprises irradiating or otherwise treating the deposited features on the substrate to form conductive features on the substrate. In certain embodiments, the process comprises exposing the deposited features to irradiation, in embodiments, ultra violet irradiation, at room temperature or at an elevated temperature that is above room temperature.

Thus, an ink composition and method is provided to form metal structures, in embodiments, silver structures, from the ink compositions herein, with simple mixing of the ink components in a short ink formation step and simple treating of the deposited ink to afford the metal structures. In embodiments, the ink components can be selected from commercially available materials.

In embodiments, a process herein comprises providing an ink composition comprising a metal salt, an initiator, and an optional solvent; depositing the ink composition onto a substrate to form deposited features; and treating the deposited features on the substrate wherein the initiator forms a compound which reduces the metal salt to metal to form conductive features on the substrate.

In embodiments, a process herein comprises: providing an ink composition comprising a metal salt; an optional solvent; and a stable component that is stable in the ink composition until treated, wherein, upon treatment, the component forms a compound that reduces the metal salt to form metal; depositing the ink composition onto a substrate to form deposited features; and treating the deposited features on the substrate to form conductive features on the substrate.

Treating the deposited features can comprise any suitable or desire method, in embodiments, a method that results in the formation of conductive features from the printed image. In embodiments, treating the deposited features comprises irradiating, in embodiments with ultra violet irradiation, allowing the stable component, in embodiments the photoinitiator, to form a reducing compound, in embodiments a radical, which reduces the metal salt on the substrate to metal to form conductive features. In embodiments, treating comprises non-thermal treating, such as light treating, in embodiments, with ultra violet irradiation. In other embodiments, treating comprises heating.

Treating of the ink can be effected by exposure of the ink image to actinic radiation at any desired or effective wavelength, in one embodiment at least about 200 nanometers, and one embodiment no more than about 480 nanometers, although the wavelength can be outside of these ranges. In embodiments, treating of the ink can be affected by exposure of the ink to actinic radiation at any desired or effective wavelength, for example, from about 100 nanometers to about 600 nanometers, such as from about 150 nanometers to about 550 nanometers or from about 200 nanometers to about 480 nanometers, although the wavelength can be outside of these ranges. Exposure to actinic radiation can be for any desired or effective period of time, in one embodiment for at least about 0.2 second, in another embodiment for at least about 1 second, and in yet another embodiment for at least about 5 seconds, and in one embodiment for no more than about 30 seconds, and in another embodiment for no more than about 15 seconds, although the exposure period can be outside of these ranges.

In embodiments, treating comprises non-thermal irradiation, in embodiments, light irradiation, in further embodiments, ultra violet irradiation.

The fabrication of conductive features, such as an electrically conductive element, from the ink composition can be carried out by depositing the composition on a substrate using any suitable deposition technique including two dimensional printing processes, three dimensional printing processes, flexographic and gravure printing processes, among others, at any suitable time prior to or subsequent to the formation of other optional layer or layers on the substrate. Thus deposition of the ink composition on the substrate can occur either on a substrate or on a substrate already containing layered material, for example, a semiconductor layer and/or an insulating layer.

The substrate upon which the metal features are deposited may be any suitable substrate including silicon, glass plate, plastic film, sheet, fabric, or paper. For structurally flexible devices, plastic substrates such as polyester, polycarbonate, polyimide sheets, and the like, may be used. The thickness of the substrate can be any suitable thickness such as, but not limited to, about 10 micrometers to over 10 millimeters with an exemplary thickness being from about 50 micrometers to about 2 millimeters, especially for a flexible plastic substrate, and from about 0.4 to about 10 millimeters for a rigid substrate such as glass or silicon.

The deposited ink composition can optionally be heated to any suitable or desired temperature, such as to from about 70° C. to about 200° C., or any temperature sufficient to, for example, assist in solvent evaporation. The heating temperature is one that does not cause adverse changes in the properties of previously deposited layers or the substrate. In embodiments, use of low heating temperatures allows use of low cost plastic substrates which have an annealing temperature of below 200° C. As described herein, the heating temperature is also a temperature at which the viscous heat decomposable liquid decomposes or evaporates. In embodiments, the ink composition herein does not require a heating step as the metal salt is reduced by non-heat irradiation of the stable component to form a reducing compound, such as a radical, without the need for thermal treating.

If a heating step is selected, the heating can be for any suitable or desired time, such as from about 0.01 second to about 10 hours. The heating can be performed in air, in an inert atmosphere, for example under nitrogen or argon, or in a reducing atmosphere, for example, under nitrogen containing from about 1 to about 20 percent by volume hydrogen. The heating can also be performed under normal atmospheric pressure or at a reduced pressure of, for example, about 1000 mbars to about 0.01 mbars.

Heating encompasses any technique that can impart sufficient energy to the heated material or substrate to 1) evaporation of solvent and/or (2) remove any optional stabilizer, and/or (3) anneal the metal. Examples of heating techniques include thermal heating (for example, at hot plate, an oven, and a burner), infra-red ("IR") radiation, laser beam, flash light, microwave radiation, or ultraviolet ("UV") radiation, or a combination thereof.

In embodiments, the resulting electrically conductive line has a thickness ranging from about 0.025 to about 10 micrometers, or from about 0.03 to about 5 micrometers. In certain embodiments, the resulting electrically conductive line has a thickness of from about 0.04 to about 2.5 micrometers. In embodiments, the ink composition provides a printed image having a bulk conductivity after heating of from about 2,500 to about 250,000 S/cm at a printed image line thickness of from about 0.05 to about 1 micrometer.

In, embodiments, the ink composition herein has a bulk conductivity that is more than about 10,000 S/cm. The conductivity of the resulting metal element produced by heating the deposited ink composition is, for example, more than about 100 Siemens/centimeter (S/cm), more than about 1,000 S/cm, more than about 2,000 S/cm, more than about 5,000 S/cm, more than about 10,000 S/cm, or more than about 50,000 S/cm.

The resulting elements can be used for any suitable or desired application, such as for electrodes, conductive pads, interconnects, conductive lines, conductive tracks, and the like, in electronic devices such as thin film transistors, organic light emitting diodes, RFID tags, photovoltaic, displays, printed antenna, and other electronic devise which required conductive elements or components.

EXAMPLES

The following Examples are being submitted to further define various species of the present disclosure. These Examples are intended to be illustrative only and are not intended to limit the scope of the present disclosure. Also, parts and percentages are by weight unless otherwise indicated.

Example 1

Prophetic Example 1

To a vial is added silver nitrate (1.69 grams, 0.01 mol) and then water (2 milliliters). To this is added hydrogen peroxide solution (2 milliliters, 30% w/w), followed by stirring for 5 minutes. The resultant ink can be applied by any suitable or desired means. In embodiments, the resultant ink can be ink jetted, aerosol jetted, or applied as a gravure/flexographic ink and then exposed to irradiation, such as ultra violet irradiation, to give silver metal.

Example 2

Prophetic Example 2

To a vial is added silver nitrate (1.69 grams, 0.01 mol) and then water (1 milliliter) and methanol (1 milliliter). To this is added 2,2'-Azobis-[2-methyl-propanimidamide]dihydrochloride (AIBN56 WSP) (1.62 grams, 0.01 mol), followed by stirring for 5 minutes. The resultant ink can be applied by any suitable or desired means. In embodiments, the resultant ink can be ink jetted, aerosol jetted, or applied as a gravure/flexographic ink and then exposed to irradiation, such as ultra violet irradiation, to give silver metal.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The invention claimed is:

1. An ink composition consisting of:
a metal salt;
an optional solvent; and
a stable component that is stable in the ink composition until treated, wherein, upon treatment, the component forms a compound that reduces the metal salt to form metal.

2. The ink composition of claim 1, wherein the stable component is an initiator, wherein, upon treatment, the initiator forms a compound which reduces the metal salt to metal.

3. The ink composition of claim 1, wherein the metal salt is selected from the group consisting of silver salt, cobalt salt, copper salt, nickel salt, gold salt, palladium salt, and combinations thereof.

4. The ink composition of claim 1, wherein the metal salt is selected from the group consisting of metal benzoate, metal halide, metal carbonate, metal citrate, metal iodate, metal iodide, metal nitrite, metal nitrate, metal acetate, metal phosphate, metal sulfate, metal sulfide, metal trifluoroacetate, and combinations thereof.

5. The ink composition of claim 1, wherein the metal salt comprises a member selected from the group consisting of silver nitrate, silver acetate, silver fluoride, silver triflate, and combinations thereof.

6. The ink composition of claim 1, wherein the stable component is a thermally activated initiator; and
wherein, upon heating, the thermally activated initiator forms a radical which reduces the metal salt to metal.

7. The ink composition of claim 1, wherein the stable component is a photoinitiator; and
wherein, upon irradiation, the photoinitiator forms a radical which reduces the metal salt to metal.

8. The ink composition of claim 1, wherein the stable component is an initiator selected from the group consisting of hydrogen peroxide, 2,2'-Azobis-[2-methyl-propanimidamide]dihydrochloride, azobisisobutyronitrile, benzoyl peroxide, and combinations thereof.

9. The ink composition of claim 1, wherein the solvent is selected from the group consisting of water, organic solvents, and combinations thereof.

10. A process comprising:
combining components consisting of a metal salt, an initiator, and an optional solvent, to form an ink;
wherein, upon treatment, the initiator forms a compound which reduces the metal salt to metal.

11. The process of claim 10, wherein the metal salt is selected from the group consisting of silver salt, cobalt salt, copper salt, nickel salt, gold salt, palladium salt, and combinations thereof.

12. The process of claim 10, wherein the metal salt is selected from the group consisting of metal benzoate, metal halide, metal carbonate, metal citrate, metal iodate, metal iodide, metal nitrite, metal nitrate, metal acetate, metal phosphate, metal sulfate, metal sulfide, metal trifluoroacetate, and combinations thereof.

13. The process of claim 10, wherein the metal salt comprises a member selected from the group consisting of silver nitrate, silver acetate, silver fluoride, silver triflate, and combinations thereof.

14. The process of claim 10, wherein the stable component is a photoinitiator; and
wherein, upon irradiation, the photoinitiator forms a radical which reduces the metal salt to metal; or
wherein the stable component is a thermal initiator; and wherein, upon heating, the thermal initiator forms a radical which reduces the metal salt to metal.

15. A process comprising:
providing an ink composition consisting of a metal salt, an initiator, and an optional solvent;
depositing the ink composition onto a substrate to form deposited features; and
treating the deposited features on the substrate wherein the initiator forms a compound which reduces the metal salt to metal to form conductive features on the substrate.

16. The process of claim 15, wherein the initiator is a photoinitiator; and
wherein treating the deposited features comprises irradiating wherein the photoinitiator forms a radical which reduces the metal salt to metal; or
wherein the initiator is a thermal initiator; and
wherein treating the deposited features comprises heating wherein the thermal initiator forms a radical which reduces the metal salt to metal.

17. The process of claim 15, wherein the initiator is a photoinitiator; and
wherein treating the deposited features comprises irradiating with ultra violet irradiation wherein the photoinitiator forms a radical which reduces the metal salt to metal.

18. The process of claim 15, wherein the metal salt is selected from the group consisting of silver salt, cobalt salt, copper salt, nickel salt, gold salt, palladium salt, and combinations thereof.

19. The process of claim 15, wherein the metal salt is selected from the group consisting of metal benzoate, metal halide, metal carbonate, metal citrate, metal iodate, metal iodide, metal nitrite, metal nitrate, metal acetate, metal phosphate, metal sulfate, metal sulfide, metal trifluoroacetate, and combinations thereof.

20. The process of claim 15, wherein the initiator is selected from the group consisting of hydrogen peroxide, 2,2'-Azobis-[2-methyl-propanimidamide]dihydrochloride, azobisisobutyronitrile, benzoyl peroxide, and combinations thereof.

* * * * *